June 24, 1969  O. F. RUIZ  3,451,358
DOUGH PERFORATING MACHINE
Filed Sept. 27, 1966
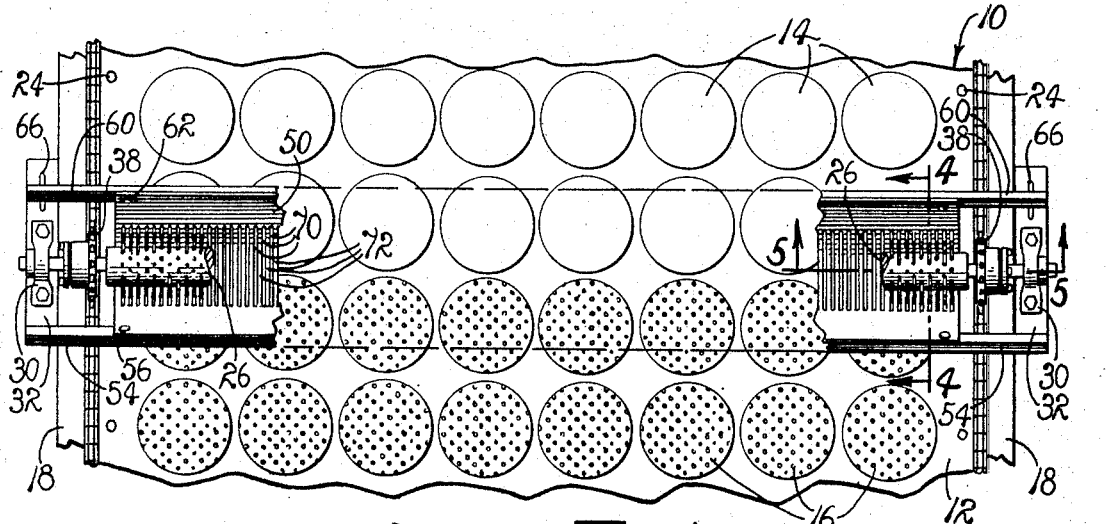
Fig. 1.
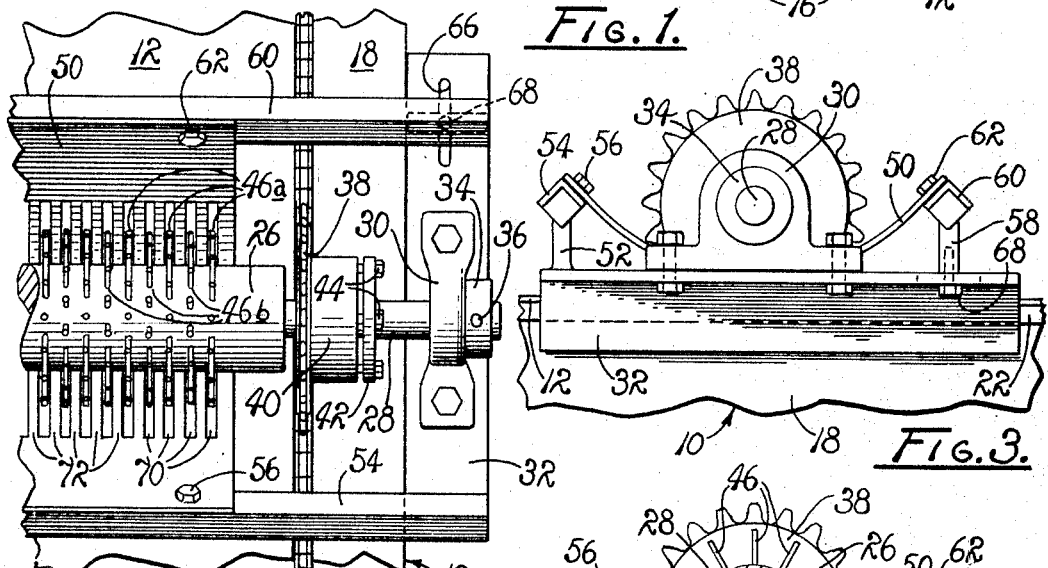
Fig. 2.
Fig. 3.
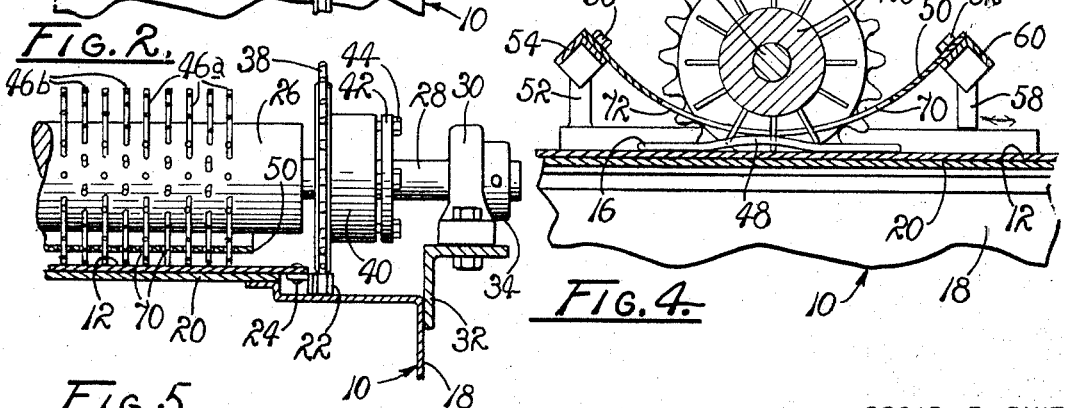
Fig. 5.
Fig. 4.
OSCAR F. RUIZ
INVENTOR
Huebner & Worrel
ATTORNEYS United States Patent Office 3,451,358
Patented June 24, 1969

3,451,358
DOUGH PERFORATING MACHINE
Oscar F. Ruiz, P.O. Box 1253,
Tulare, Calif. 93274
Filed Sept. 27, 1966, Ser. No. 582,410
Int. Cl. A21c *11/12;* A21d *8/02*
U.S. Cl. 107—15       8 Claims

ABSTRACT OF THE DISCLOSURE

A machine for perforating substantially flat pieces of pieces of dough including a drum with perforating spikes, and an arcuate comb for removal of the pieces of dough from the spikes, the comb being adjustably mounted for varying the arcuity thereof for accommodating different thicknesses of dough.

The present invention relates generally to a device for making pizzas and more specifically to an automated step in the manufacture of pizza shells.

Heretofore, pizza shells have been primarily made by hand from dough and formed into a generally circular shape, the shells at least partially baked, and then covered with the usual combination of tomato sauce, cheese, seasoning materials, and the baking completed.

The hand or manual making of the pizza shells while satisfactory for home use or consumption and for restaurant production, is not suitable to large scale bakery manufacture because of practical and economical problems involved. Prior to the present invention, the most popular procedure for the mechanized production of pizza shells involved the hand forming of the shells in round pans having circumscribing edges relied upon to confine the shells to circular form. This manual step in an otherwise mechanized procedure seriously limited production, resulted in undesirably high labor costs, and produced an inferior product. Manual formation of the shells is demonstrably impractical where production of a wholesale commercial volume is desired.

Heretofore, automated production of pizza shells has been attempted in which the dough, having been prepared, is then formed into circular shape, partially baked, and packaged for sale to the consuming public.

It has been found, however, that in the manufacture of pizza shells, especially where a partial prebaking is performed before packaging and distribution to wholesale or retail outlets is effected, there has been a tendency for the dough comprising the pizza shell to rise, become excessively thick, and to acquire an objectionable irregularity in thickness. In some instances the shells attain a thickness of one-half inch or more due primarily, it has now been discovered, to entrained gases within the dough, which are affected by the heat of partial baking. These objectionable tendencies to become excessively thick and uneven have virtually precluded the production and sale of partially baked pizza shells. Such shells have been unattractive, difficult to package, and have met with such sales resistance as to preclude successful development of a market. For many years, the bakery industry has sought a solution to the problem of excessive and uneven rising of the dough in pizza shells and the like during the partial prebaking. Compressing the dough has been tried without success. Prior to the present invention, the only partially successful process for avoiding the problem involved soaking or coating the shells with excessive quantities of oil before prebaking.

While this latter method had been conventional in previous pizza pie manufacture, it creates problems in handling, packaging and subsequent use by an ultimate consumer. It results in a product which rather satisfactorily avoids excessive rising but which is obviously oily and greasy, which soils its packages, making attractive visual display impossible, and which in fact is difficult to digest, of impaired taste and of excessively high cholesterol content.

It is a primary object of the present invention to provide apparatus for the production of pizza pie shells and the like, in an automated and continuous manufacturing process, which eliminates the tendency of the pizza shells to become excessively thickened and uneven during a partial baking prior to distribution for wholesale or retail use. The invention is, of course, equally applicable to shells which can be considered as being raw or not partially baked or which are fully baked, neither of which, however, currently appear marketable.

The present invention also contemplates treating pizza shells in the courses of production which later, during baking, enhances the retentive capabilities of the shell with respect to the covering or material placed thereon for subsequent baking and completion of a pizza pie.

More specifically the present invention contemplates apparatus for commercial production of pizza pie shells incorporating a perforating operation of the individual pizza shells which substantially obviates the tendency of the pizza shell to become excessively or unevenly thickened during a partial prebaking or subsequent complete baking operation.

The present invention teaches apparatus for treating or perforating pizza pie shells in a completely automatic manner adapted for high speed commercial production thereof.

Additional objects, features, and advantages of the present invention will be more readily apparent from the following detailed description of an embodiment of apparatus for practicing the invention, and the method thereof, when taken together with the accompanying drawing in which:

FIG. 1 is a fragmetary plan view, portions being broken away, of apparatus of an embodiment of the invention;

FIG. 2 is a fragmentary enlarged plan view of a portion of the apparatus, showing details of construction and drive means for the invention;

FIG. 3 is a fragmentary end elevational view of the apparatus;

FIG. 4 is an enlarged sectional view taken on line 4—4 of FIG. 1; and

FIG. 5 is a fragmentary enlarged view taken on line 5—5 of FIG. 1.

Referring in detail to the drawing, a pizza shell perforating mechanism is indicated generally at 10, and includes a continuous metal conveyor or the like 12 adapted to support and carry thereon a multiplicity of pizza shells 14, shown in the raw untreated condition, for subsequent treatment in accordance with the invention to result in perforated pizza shells indicated at 16. The conveyor is adaptable for conveying the so-treated pizza shells into an oven for at least partial baking thereof, or if desired to other means, such as conveyor means which can be utilized for passing the shells into a baking oven or to an area or region for packaging thereof if the pizza shell is to be packaged in a raw state.

Means are provided for supporting the conveyor 12 in its travel and, referring to FIG. 5, this can consist of a frame, generally designated 18, adapted for mounting on a floor or the like and which has affixed thereto a horizontal conveyor support 20 slidably supporting the conveyor in a conventional manner.

The conveyor 12 is suitably driven by conveyor chains 22, preferably in a manner providing for adjustability of the speed of travel of the conveyor. The chains are connected to the conveyor 12 by means of rivets or the like 24, and each chain is supported on a portion of the frame as clearly shown in FIG. 5. Any suitable means can be provided for preforming the pizza shells and depositing them on the conveyor.

The essence of the present invention resides in mechanism which is operable to perforate each of the pizza shells, preferably entirely therethrough, as the shells travel along on the conveyor. This mechanism includes a drum or cylinder 26 carried on a shaft 28, which is rotatably journaled at both ends in bearing blocks 30 supported on a channel member 32 secured to frame 18, and bolts or the like are used for securing the bearing blocks 30 to the channel.

Collars 34 are provided on the shafts, externally of the bearing blocks and affixed to the shafts by means of setscrews 36 or the like, properly to position and secure the shaft with respect to the bearing blocks, the frame and conveyor mechanism. A sprocket 38 is mounted on the shaft 28 by means of a hub 40 which is operatively associated with a plate 42, and adjusting bolts 44 are provided which are operable to position the sprocket 38 with respect to the conveyor chain 22. As shown in the drawing, the sprocket 38 is directly driven by, and therefore has its rotational speed correlated with that of the conveyor chain 22 so as to inter-relate the speed of movement of the conveyor 12 with that of the drum or cylinder 26.

The drum or cylinder 26 carries thereon a plurality of spikes 46, extending substantially across the entire operative length of the drum and these spikes are arranged in staggered rows as indicated at 46a and 46b respectively. The purpose of the staggering of the spikes into two or more rows serves the multiple function of permitting an increased predetermined perforation of a pizza shell passing under the perforating mechanism, and additionally decreases the possibility of the shell being drawn upwardly by the spikes.

The spikes 46 are preferably of such a length, as shown in FIG. 4, as to penetrate through the entire thickness or depth of a pizza shell, and at the lowermost rotational position of the cylinder 26 the ends of the spikes are very closely positioned or spaced with respect to the upper surface of the conveyor.

As a pizza shell passes beneath the rotating array of spikes as above described, there is a tendency for the spikes just after piercing the pizza shell, to move upwardly and lift the shell from the conveyor as somewhat exaggerated at 48 in FIG. 4. In order to prevent the shell from being retained by or carried by the array of spikes, an arcuate comb structure 50 is provided which underlies the spike carrying drum. This comb preferably consists of an elongated generally trough-shaped sheet metal member which extends longitudinally of the cylinder 26 and is bowed to have a convex surface facing downwardly. One end of the comb 50 is fixedly supported by means of a mounting bracket 52 secured on the machine frame, and having an angle member 54 affixed thereto. A bolt 56 or the like secures an edge of the comb structure to the channel 54. At the opposite side of the comb structure a second adjustably mounted bracket 58 is provided having a channel member 60 supported thereby, and adapted to affix an edge of the comb thereto by means of a bolt 62. The brackets 58 are adjustably supported on portions of the machine frame which are provided with slots 66 through which affixing bolts 68 for the brackets 58 extend. It will be seen that adjustment of the position of the brackets 58, by means of the bolts 68 and slots 66, varies the arcuity or convexity of the comb 50 and permits raising and lowering of the comb structure with respect to the conveyor and the drum to accommodate different thicknesses of pizza shells, and otherwise to accommodate the operation thereof to the desired machine operation.

The comb 50 is provided with a plurality of longitudinally extending slots 70 which are transversley spaced with respect to the drum, and aligned with the spaced rows of spikes carried by the drum so that the spikes can pass therethrough for penetrating the pizza shell. The portions of the comb intermediate the slots, as indicated at 72, serve the purpose of restraining upward movement of a pizza shell which has been perforated by the spikes and prevents the pizza shell from being carried around on the spikes with rotation of the drum. The operation of the apparatus and this result are clearly illustrated in FIG. 4 of the drawing.

From the foregoing description, the operation of the present pizza shell perforating mechanism will be readily apparent. The result of operation of the apparatus is to provide a plurality of perforations in the pizza shells and these perforations subsequently, during baking of the shells, permit passage therethrough of entrained or entrapped gases, thereby to eliminate excessive thickening or uneven rising of the pizza shells. This manifestly results in a flat pizza shell produced in an automated process wherein inefficiency of known manual production of pizza shells is overcome, and the resultant pizza shell has an improved and substantially uniform thickness and appearance. Further, the previous requirement of soaking or coating the shells with excessive quantities of oil to inhibit rising is obviated by the present invention.

It is also contemplated, in accordance with the present invention, that the lower surface of the comb and/or the external surfaces of the spikes can be coated with a friction resistant material such as a polymeric material of the nature of Teflon, Kel-F, nylon, or the like. Other suitable frictional reducing materials, as well known in the trade can be utilized.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a perforating machine for providing a multiplicity of perforations through a substantially flat preformed dough piece while it is being conveyed along a predetermined path of travel by dough conveying means, rotatable means positioned above the path of travel of the dough piece, and a plurality of spikes mounted on the rotatable means adapted for perforating the dough piece to provide a multiplicity of gas venting openings therein, the spikes extending substantially the width of the dough conveying means and being in staggered rows on the rotatable spike mounting means, driving means for the dough conveying means, driving means for the rotatable spike mounting means, the rotatable spike mounting drive means being directly interconnected with the dough conveying driving means whereby movement of the spikes is substantially synchronized with the longitudinal movement of dough pieces on the dough conveying means to minimize tearing of dough during perforation thereof, said rotatable means including a drum, an arcuate comb positioned between the drum and the dough conveying means, said comb having a plurality of slots through which the spikes extend for perforation of the dough piece, and means mounting the ends of the comb, the mounting means at one end of the comb being adjustable relative to the other mounting means along a path generally parallel to the path of travel for controlling the relative position of the comb between the dough conveying means and the drum and changing the arcuity thereof for accommodating various thicknesses of dough.

2. In a machine as claimed in claim 1, the dough contacting surface of said comb and the exterior surfaces of said spikes being coated with a friction reducing material.

3. A dough perforating machine comprising a conveyor providing a substantially horizontal upper run adapted to receive flat pieces of dough to be perforated, the upper run being supported at a substantially fixed elevation; a shaft rotatably mounted substantially transversely of the conveyor in upwardly spaced relation to the upper run; a plurality of spikes mounted on the shaft and radially extended therefrom in sets disposed in planes substantially normal to the shaft spaced axially of the shaft; means for motivating the conveyor at a predetermined linear speed and rotating the shaft with the extended ends of the spikes orbited at a speed substantially equal to said linear speed; and a downwardly facing convex comb disposed between the upper run of the conveyor and the shaft having portions extended between the sets of spikes, said comb being adjustable for varying the convexity thereof to accommodate different thicknesses of dough.

4. The machine of claim 3 in which the comb has a movable support at one end thereof, said support being mounted for movement along a path extending transversely of the axis of curvature of the comb.

5. The machine of claim 4 in which said path of movement of the support is defined by an elongated slot having a longitudinal axis lying in a plane disposed substantially perpendicular to said axis of curvature.

6. A device for stripping material from movable spikes and the like comprising a structure having material engaging portions between which said spikes are adapted to move, said portions having an arc of curvature and being disposed in facing relation to material moving along a path of travel, and said structure being mounted on supports at opposite ends thereof, the supports being adjustable relative to each other along a path of movement generally parallel to the path of travel for varying the spacing between the ends of the portions and changing the arcuity thereof for accommodating different thicknesses of material.

7. The device of claim 6 in which the path of movement is defined by an elongated slot.

8. In a machine for perforating a substantially flat piece of dough while it is conveyed by a conveyor along a path of travel, a rotatable drum above the conveyor, a plurality of spikes mounted on the drum for perforating the dough piece during travel on the conveyor, drive means connected with the conveyor and with the drum for synchronized movement of the spikes and the conveyor, and an arcuate comb positioned between the drum and the conveyor for stripping dough from the spikes, said comb being adjustable along a line generally parallel to the path of travel of the conveyor for varying the arcuity of the comb to accommodate different thicknesses of dough between the conveyor and the comb.

References Cited

UNITED STATES PATENTS

| | | | |
|---|---|---|---|
| 787,105 | 4/1905 | Maxim | 83—122 |
| 1,364,132 | 1/1921 | Miller | 18—2 |
| 2,127,651 | 8/1938 | Panther. | |
| 2,176,751 | 10/1939 | Spang | 17—26 |
| 2,774,316 | 12/1956 | Daino. | |

FOREIGN PATENTS 937,992  9/1963  Great Britain.

ROBERT W. MICHELL, *Primary Examiner.*

ARTHUR O. HENDERSON, *Assistant Examiner.*

U.S. Cl. X.R.

38—121, 660